US 8,251,428 B2

(12) United States Patent
Yamada et al.

(10) Patent No.: US 8,251,428 B2
(45) Date of Patent: Aug. 28, 2012

(54) SEAT SLIDE APPARATUS FOR VEHICLE

(75) Inventors: Yukifumi Yamada, Toyota (JP); Naoki Goto, Tokai (JP); Shinya Isobe, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 289 days.

(21) Appl. No.: 12/695,248

(22) Filed: Jan. 28, 2010

(65) Prior Publication Data

US 2010/0187885 A1 Jul. 29, 2010

(30) Foreign Application Priority Data

Jan. 29, 2009 (JP) ................................. 2009-018777

(51) Int. Cl.
*B60N 2/02* (2006.01)
(52) U.S. Cl. .................................................. 296/65.13
(58) Field of Classification Search ............... 296/65.13, 296/65.14, 68.1; 238/264, 287, 310, 355; 297/344.1, 473; 298/429, 430
See application file for complete search history.

(56) References Cited

U.S. PATENT DOCUMENTS

| | | | | |
|---|---|---|---|---|
| 4,659,107 A * | 4/1987 | Yokote | | 280/804 |
| 4,666,209 A * | 5/1987 | Kazaoka et al. | | 297/344.1 |
| 4,787,756 A * | 11/1988 | Pilarski | | 384/47 |
| 5,967,604 A * | 10/1999 | Yoshida et al. | | 297/216.19 |
| 6,176,460 B1 * | 1/2001 | Kojima et al. | | 248/429 |
| 6,631,879 B2 * | 10/2003 | Hibino et al. | | 248/429 |
| 6,824,187 B2 * | 11/2004 | Motozawa et al. | | 296/68.1 |
| 7,637,469 B2 * | 12/2009 | Yamada et al. | | 248/430 |
| 7,770,863 B2 * | 8/2010 | Yamada et al. | | 248/430 |
| 7,789,368 B2 * | 9/2010 | Yamada et al. | | 248/430 |
| 8,091,851 B2 * | 1/2012 | Yamada et al. | | 248/430 |
| 2006/0108492 A1 * | 5/2006 | Kojima et al. | | 248/429 |
| 2008/0129017 A1 * | 6/2008 | Okazaki et al. | | 280/727 |
| 2010/0187397 A1 * | 7/2010 | Yamada et al. | | 248/429 |
| 2011/0018302 A1 * | 1/2011 | Endo et al. | | 296/68.1 |
| 2011/0057086 A1 * | 3/2011 | Nonomiya | | 248/430 |
| 2011/0121154 A1 * | 5/2011 | Kimura et al. | | 248/429 |
| 2012/0074288 A1 * | 3/2012 | Yamada et al. | | 248/430 |

FOREIGN PATENT DOCUMENTS

| | | |
|---|---|---|
| JP | 7-9694 | 3/1995 |
| JP | 2002-154354 A | 5/2002 |

* cited by examiner

*Primary Examiner* — Kiran B Patel
(74) *Attorney, Agent, or Firm* — Buchanan Ingersoll & Rooney PC

(57) ABSTRACT

A seat slide apparatus for a vehicle includes a lower rail, formed into a longitudinal shape and adapted to be fixed to a vehicle floor, an upper rail adapted to be fixed to a seat frame, and assembled to the lower rail to be relatively movable in a longitudinal direction of the lower rail, and a detachment prevention mechanism including an elongated hole, which is formed at the bottom wall portion to open therethrough and which extends in the longitudinal direction, and a load receiving member whose upper end portion is fixed to the upper wall portion and whose lower end portion is inserted downwardly through the elongated hole so as to be movable in an extending direction of the elongated hole, and is engageable with the bottom wall portion in the vicinity of the elongated hole to restrict a movement of the upper rail in an upper direction.

19 Claims, 7 Drawing Sheets

F I G. 10
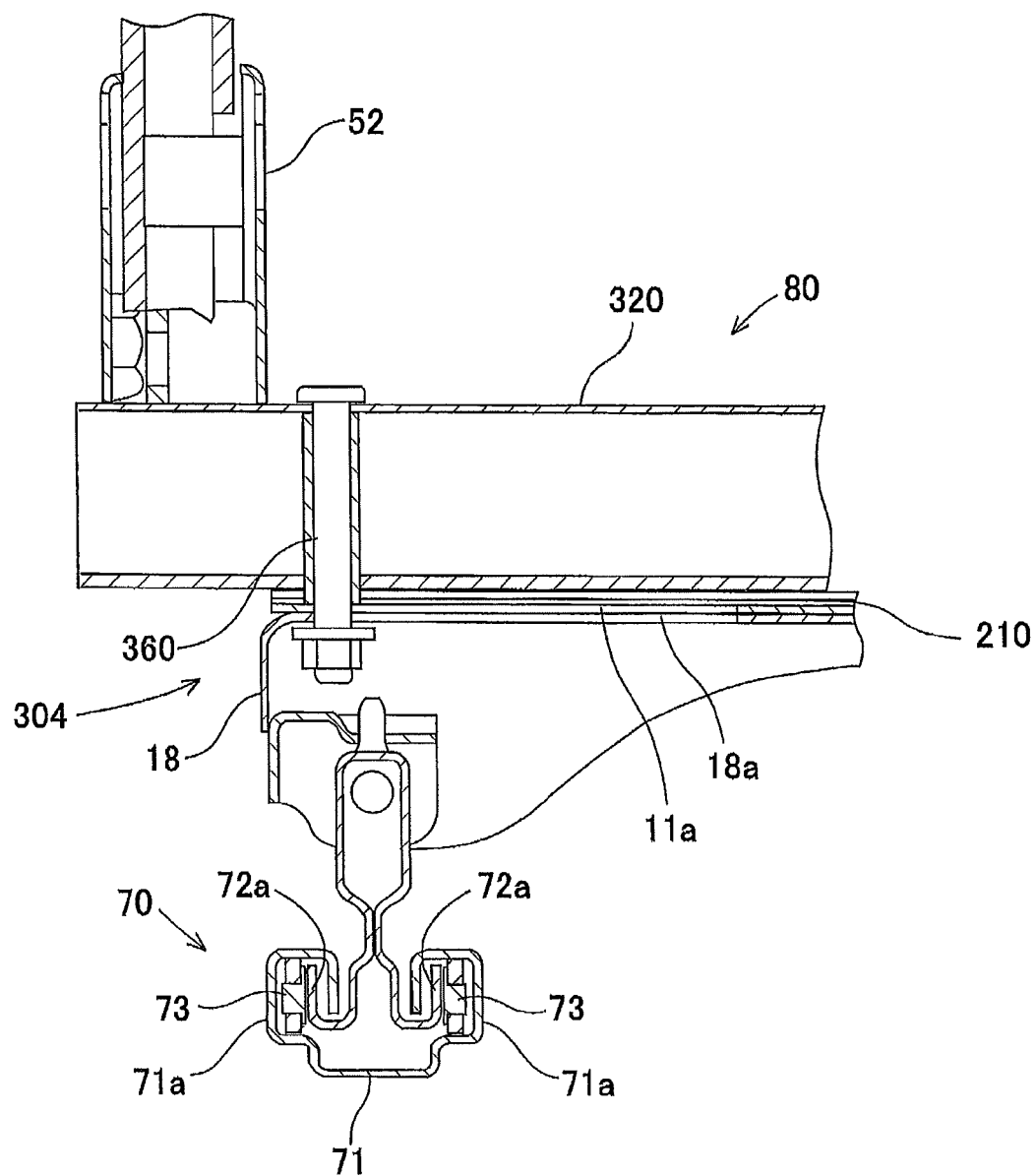

SEAT SLIDE APPARATUS FOR VEHICLE

CROSS REFERENCE TO RELATED APPLICATIONS

This application is based on and claims priority under 35 U.S.C. §119 to Japanese Patent Application 2009-018777, filed on Jan. 29, 2009, the entire content of which is incorporated herein by reference.

TECHNICAL FIELD

This disclosure relates to a seat slide apparatus for a vehicle.

BACKGROUND DISCUSSION

A known seat slide apparatus for a vehicle includes a pair of lower rails, which are fixed to a vehicle floor via attachment brackets, and a pair of upper rails, which are movably arranged to the lower rails and to which a vehicle seat is attached. Further, the vehicle seat includes a seat belt for securely restraining an occupant to the seat.

An upper belt anchorage and lower belt anchorages for supporting corresponding end portions of the seat belt are usually arranged at a body frame of the vehicle. On the other hand, the upper belt anchorage and the lower belt anchorages may be provided at a rear portion of the seat frame in order to achieve, for example, free movement of the vehicle seat, thereby a belt-integrated seat is provided. In a case where the vehicle is hit, an inertia force is applied to the occupant, and the seat belt is drawn in a front direction of the vehicle by means of a tension force. Consequently, a large load is applied to the upper and lower belt anchorages, and a moment is applied to the seat frame. In other words, a detachment load for detaching the rear portion of the seat frame from a vehicle floor in an upper direction may be generated. Accordingly, in regard to safety, it may be important to increase a resistance load of the seat slide apparatus, which supports the seat frame, relative to the detachment load.

According to JPH07-009694Y, an attachment configuration of a seat adjustor includes a lower hook, which is fixed to a lower rail, and an upper hook, which is fixed to an upper rail to be engageable with the lower hook. When a detachment load is applied from belt anchorages to the upper rail, the lower hook and the upper hook engage with each other so as to bear the detachment load.

The upper hook and the lower hook are arranged to the upper rail and the lower rail, respectively, so as to protrude from horizontal walls of the upper rail and the lower rail, respectively, in a width direction of the vehicle. The lower hook and the upper hook engage with each other at an outside of a cross-sectional area formed by the upper and lower rails.

A position where the lower and upper hooks engage with each other is displaced relative to a bottom wall portion of the lower rail, at which an attachment bracket is fixed, in a horizontal direction. Therefore, when the detachment load is applied to the upper rail, a large bending moment may be applied to the lower rail. Accordingly, it may be difficult to increase a resistance load. Further, since the lower and upper hooks are provided at the outside of the cross-sectional area formed by the lower and upper rails, a size of a seat adjustor may be enlarged.

On the other hand, according to JP2002-154354A, an upper hook and a lower hook are arranged at an inside of a cross-sectional area formed by an upper rail and a lower rail. When the detachment load is applied to the upper rail, the lower and upper hooks engage with each other at the inside of the cross-sectional area formed by the lower and upper rails. A bottom wall portion of the lower rail, at which an attachment bracket is fixed, and a position where the lower and upper hooks engage with each other are not displaced from each other in a horizontal direction when seen in a planar surface extending orthogonally to a longitudinal direction of the lower rail. Therefore, a resistance load may be increased. Further, the lower and upper hooks are arranged at an inside of the cross-sectional area formed by the lower and upper rails. Therefore, a size of the lower and upper rails may be reduced.

However, according to a configuration disclosed in JP2002-154354A, the lower and upper hooks are arranged at the lower and upper rails, respectively, so as to extend in a longitudinal direction of the lower and upper rails. Therefore, configurations of the lower and upper rails may be complex, and weights thereof may be large. Further, due to a detachment load, the lower and upper hooks may be elastically deformed in a direction where the lower and upper hooks are detached from each other, and the lower and upper hooks may not sufficiently support the detachment load. Accordingly, the detachment of the upper rail may not be effectively restricted.

A need thus exists for a seat slide apparatus for a vehicle, which is not susceptible to the drawback mentioned above.

SUMMARY

According to an aspect of this disclosure, a seat slide apparatus for a vehicle includes: a lower rail, formed into a longitudinal shape, adapted to be fixed to a vehicle floor and including a bottom wall portion which extends horizontally, side wall portions which extend upwardly from both ends of the bottom wall portion in a width direction thereof and first vertical wall portions which are bent downwardly at ends of the corresponding side wall portions; an upper rail adapted to be fixed to a lower portion of a seat frame for supporting a seat cushion, including an upper wall portion which extends horizontally, second vertical wall portions which extend downwardly from both ends of the upper wall portion in a width direction thereof and engagement wall portions which are bent upwardly at ends of the second vertical wall portions, thereby engaging with the corresponding first vertical wall portions, and assembled to the lower rail so as to be relatively movable in a longitudinal direction of the lower rail; and a detachment prevention mechanism including an elongated hole, which is formed at the bottom wall portion so as to open therethrough and which extends in the longitudinal direction of the lower rail, and a load receiving member whose upper end portion is directly or indirectly fixed to the upper wall portion of the upper rail and whose lower end portion is inserted downwardly through the elongated hole so as to be movable in an extending direction of the elongated hole, and is engageable with the bottom wall portion of the lower rail in the vicinity of the elongated hole so as to restrict a movement of the upper rail in an upper direction.

BRIEF DESCRIPTION OF THE DRAWINGS

The foregoing and additional features and characteristics of this disclosure will become more apparent from the following detailed description considered with the reference to the accompanying drawings, wherein:

FIG. 10 is a cross-sectional view taken along line X-X in FIG. 9 according to the modified embodiment of the third embodiment.

DETAILED DESCRIPTION

Embodiments of a seat slide apparatus for a vehicle will be explained hereinafter with reference to the attached drawings. Directions, such as front, rear, left, right upper, lower and the like correspond to an orientation of the seat slide apparatus for the vehicle.

First Embodiment

Figure 1:
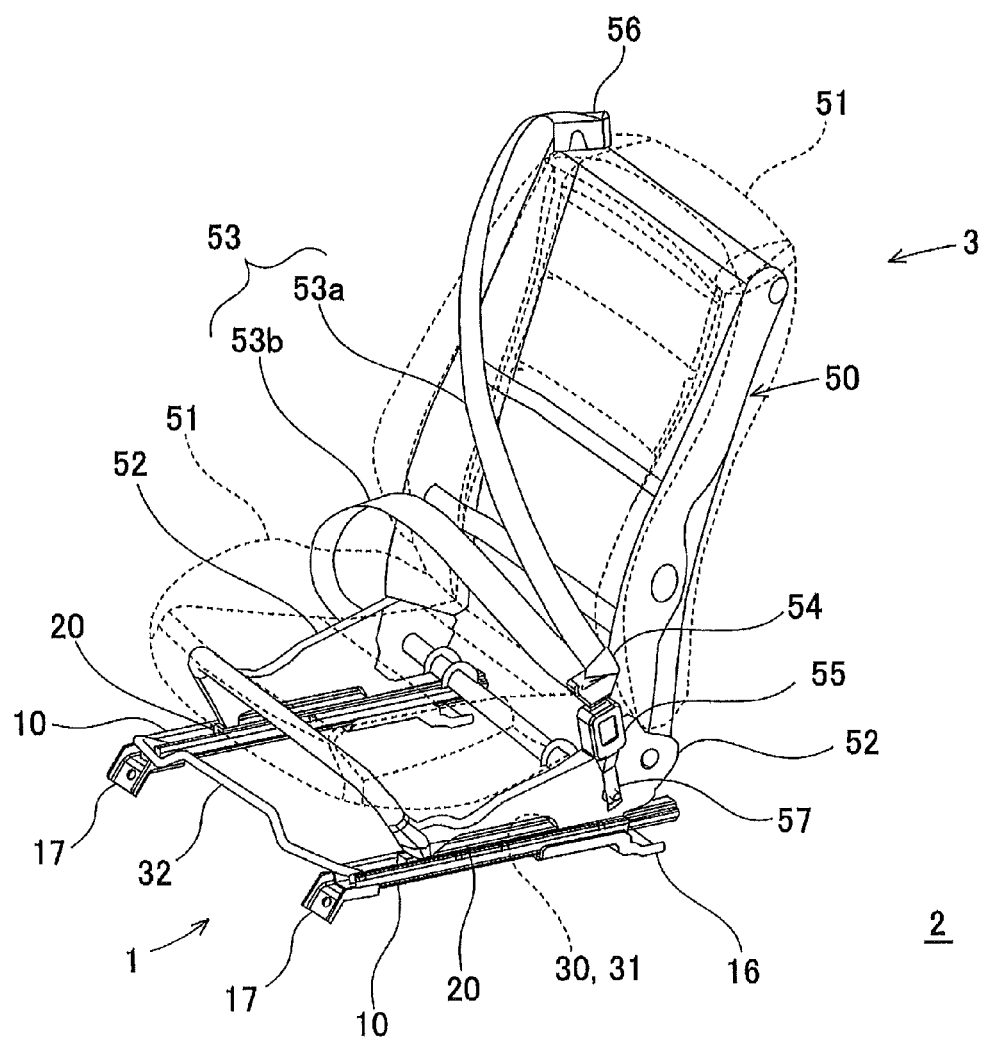
FIG. 1 is a schematic view illustrating a state where a seat for a vehicle is attached to a seat slide apparatus for a vehicle according to a first embodiment.

A seat slide apparatus 1 for a vehicle (which will be referred to as a seat slide apparatus 1 hereinafter) according to a first embodiment will be describer hereinafter with reference to the attached FIGS. 1 to 4. FIG. 1 is a transparent view illustrating a seat frame 50 at a portion of a seat surface and a back surface of a seat cushion 51 of a seat 3 for a vehicle (which will be referred to as a vehicle seat 3 hereinafter).

The seat slide apparatus 1 includes a pair of lower rails 10, a pair of upper rails 20, detachment prevention mechanisms 4 and lock mechanisms 30. The pair of lower rails 10 is formed into a longitudinal shape, and is fixed to a vehicle floor 2 so as to extend in a front-rear direction of the vehicle. The detachment prevention mechanisms 4 restrict a detachment of the pair of upper rails 20 from the pair of lower rails 10 caused by a detachment load. The lock mechanisms 30 lock the pair of upper rails 20 relative to the pair of lower rails 10 and release the locking of the pair of upper rails 20 relative to the pair of lower rails 10. The vehicle seat 3 includes the seat frame 50, the seat cushion 51 and the like. The seat frame 50 is fixed to the seat slide apparatus 1 and is movable in the front-rear direction of the vehicle. Left and right sides of the seat slide apparatus 1 include substantially the same configuration and function. Therefore, only one side of the seat slide apparatus 1 will be mainly described hereinafter.

Figure 2:
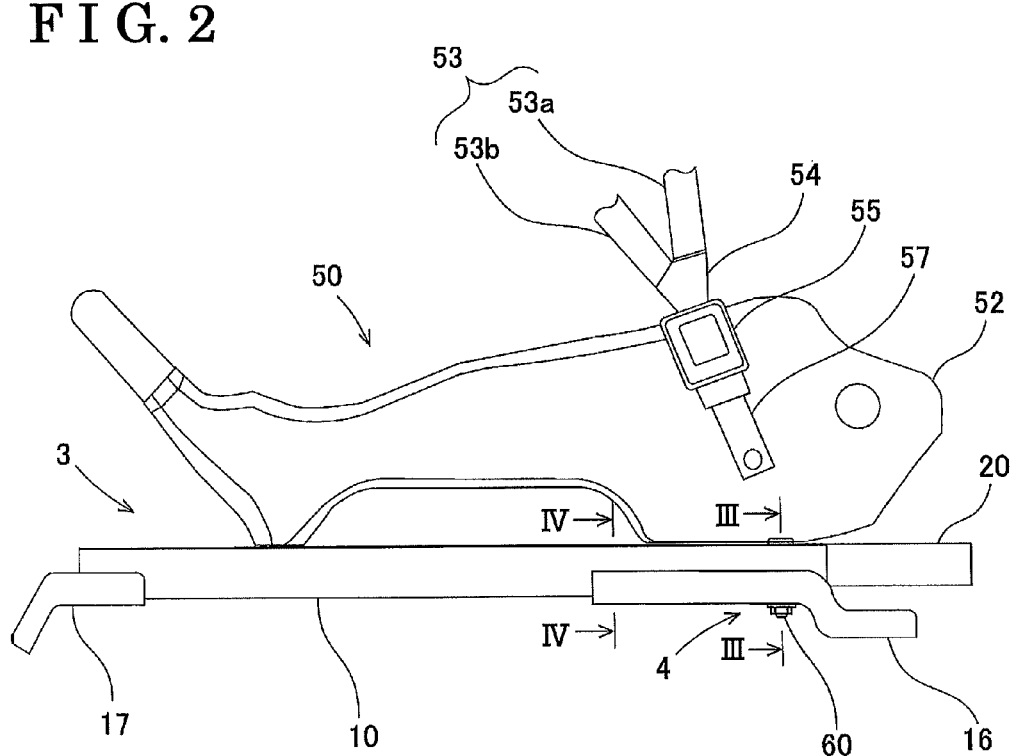
FIG. 2 is a side view illustrating a lower rail and an upper rail according to the first embodiment.
Figure 3:
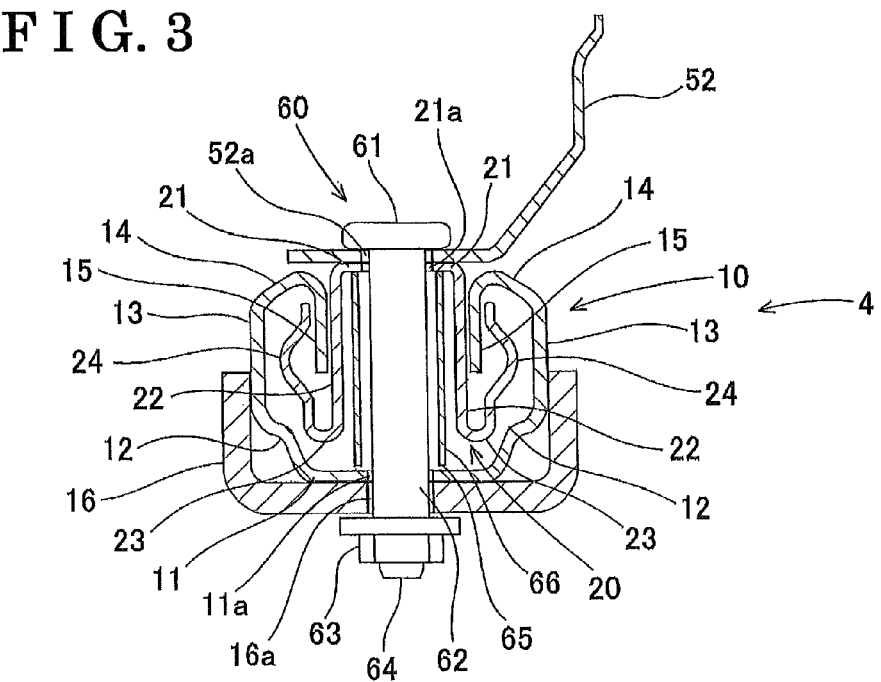
FIG. 3 is a cross-sectional view taken along line III-III in FIG. 2 according to the first embodiment.
Figure 4:
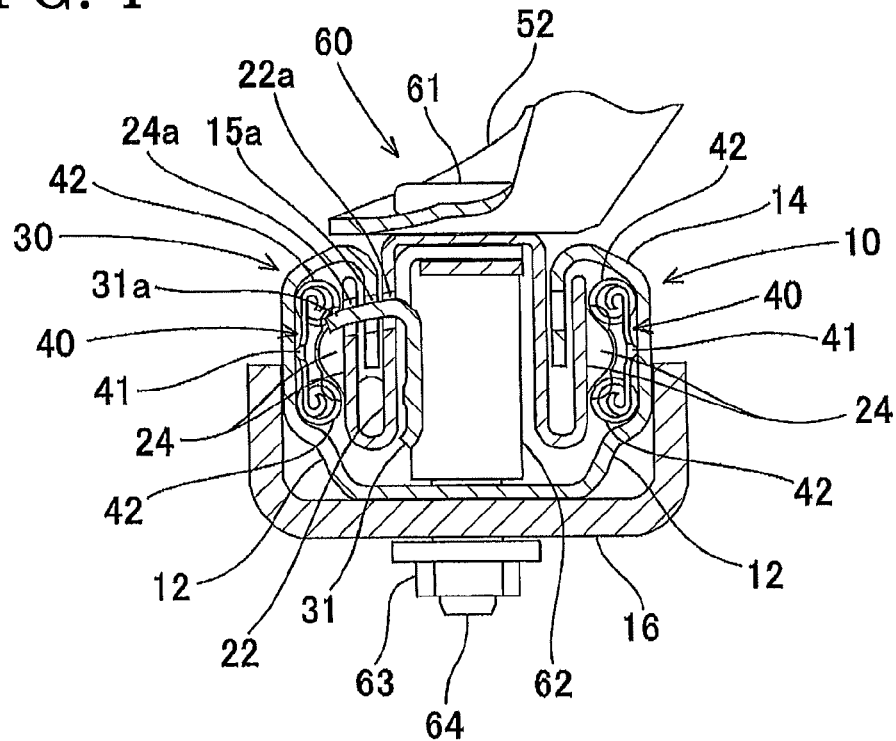
FIG. 4 is a cross-sectional view taken along line IV-IV in FIG. 2 according to the first embodiment.

As illustrated in cross section in FIGS. 2 to 4, the lower rail 10 includes a bottom wall portion 11, bent portions 12, side wall portions 13, upper portions 14, first vertical wall portions 15 and first and second attachment brackets 16 and 17. Each of the side wall portions 13 is configured so as to include each of the bent portions 12 and each of the upper portions 14. The bottom wall portion 11 is formed so as to extend substantially in parallel with the vehicle floor 2. The bottom wall portion 11 is fixed to the vehicle floor 2 via the first and second attachment brackets 16 and 17, which are provided at rear and front sides of the vehicle, respectively. Further, a first elongated hole 11a (an elongated hole 11a) is formed at an intermediate portion of the bottom wall portion 11 in a width direction thereof so as to extend in a longitudinal direction of the lower rail 10 and so as to open through the bottom wall portion 11 in an upper-lower direction. A retention pin 60 is inserted through the elongated hole 11a.

The bent portions 12 are bent so as to extend from both ends of the bottom wall portion 11 toward an outer side of the lower rail 10 in a width direction thereof. The bent portions 12 support lower portions of corresponding slide supporting members 40 (described later). The side wall portions 13 are formed so as to extend upwardly from upper end portions of the corresponding bent portions 12. The upper portions 14 are formed so as to extend upwardly toward an inner side of the lower rail 10 in the width direction thereof from upper end portions of the corresponding side wall portions 13. The upper portions 14 support upper portions of the corresponding slide support members 40.

The first vertical wall portions 15 are formed so as to extend downwardly from inner end portions of the corresponding upper portions 14. Each of the first vertical wall portions 15 is formed with a plurality of first lock holes 15a, to/from which lock hooks 31a of the lock mechanism 30 are respectively engageable/disengageable, so as to include a predetermined interval between adjacent first lock holes 15a in the longitudinal direction of the lower rail 10. As illustrated in FIGS. 2 and 3, the first and second attachment brackets 16 and 17 are fixed to the bottom wall portion 11 and the side wall portions 13 of the lower rail 10 at rear and front sides of the vehicle, respectively, by means of welding and the like. The first and second attachment brackets 16 and 17 are fixed to the vehicle floor 2 by means of bolts and the like. The first attachment bracket 16 is formed with a second elongated hole 16a, through which the retention pin 60 is inserted, below the first elongated hole 11a, formed to open through the bottom wall portion 11 of the lower rail 10, so as to extend in the longitudinal direction of the lower rail 10. The first and second attachment brackets 16, which are integrally fixed to the bottom wall portion 11 of the lower rail 10, serve as an attachment bracket portion.

As illustrated in cross section in FIGS. 3 and 4, the upper rail 20 includes an upper wall portion 21, second vertical wall portions 22, connecting portions 23 and engagement wall portions 24. Each of the second vertical wall portions 22 is configured so as to include each of the connecting portions 23. The upper wall portion 21 is formed so as to extend substantially in parallel with the vehicle floor 2 and the bottom wall portion 11 of the lower rail 10. The upper wall portion 21 is connected to a lower portion of a lower arm 52, which is formed at a lower portion of the seat frame 50, by means of welding and the like. The upper wall portion 21 is formed with a first hole (a hole) 21a, through which the retention pin 60 is inserted, at an intermediate portion thereof in a width direction thereof.

The second vertical wall portions 22 are formed so as to extend downwardly from ends of the upper wall portion 21 in a width direction thereof. The connecting portions 23 extend outwardly from lower ends of the corresponding second vertical wall portions 22. Each of the connecting portions 23 connects the second vertical wall portion 22 and the engagement wall portion 24 so that the second vertical wall portion 22 and the engagement wall portion 24 face each other. The engagement wall portions 24 are bent at a portion between the corresponding bent portions 12 and the corresponding upper portions 14 of the lower rail 10, where the engagement wall portions 24 support upper and lower portions of the corresponding slide supporting portions 40.

Each of the second vertical wall portions 22 is formed with a plurality of second lock holes 22a, to/from which the lock hooks 31a of the lock mechanism 30 are respectively engageable/disengageable, so as to include a predetermined interval between adjacent second lock holes 22a in a longitudinal direction of the upper rail 20. Likewise, each of the engagement wall portions 24 is formed with a plurality of third lock holes 24a, to/from which the lock hooks 31a of the lock mechanism 30 are respectively engageable/disengageable, so as to include a predetermined interval between adjacent third lock holes 24a in a longitudinal direction of the upper rail 20. Consequently, the lock hooks 31a of the lock mechanism 30 are inserted through the corresponding second lock holes 22a, the corresponding first lock holes 15a and the corresponding third lock holes 24a, and thereby the lower rail 10 and the upper rail 20 engage with each other. The upper rail 20 is fixed to the lower arm 52 of the seat frame 50 by means of a riveting pin, welding and the like. Therefore, in order to adjust a position of the vehicle seat 3 in the front-rear direction of the vehicle, the upper rail 20 slides integrally with the seat frame 50 relative to the lower rail 10 in the front-rear direction of the vehicle, and then the upper rail 20 is lockable to the lower rail 10.

The lock mechanism 30 includes a lock lever 31 and a release lever 32. The lock lever 31 is rotatably provided at the upper rail 20. The lock lever 31 includes the lock hooks 31a at an upper portion thereof. The lock hooks 31a are engageable/disengageable to/from the corresponding second lock holes 22a, the corresponding first lock holes 15a and the corresponding third lock holes 24a. The lock lever 31 is biased by means of a compression spring so that the lock hooks 31a engage with the corresponding second lock holes 22a, the corresponding first lock holes 15a and the corresponding third lock holes 24a. The release lever 32 includes an operating portion, a transmitting portion and a thrusting portion. The operating portion is arranged at a front side of the lower rail 10. The transmitting portion for transmitting a manual operation of an occupant to the thrusting portion, extends along the longitudinal direction of the lower rail 10 toward a rear side of the lower rail 10. The lock lever 31 includes an interlocking portion. The interlocking portion engages with the thrusting portion of the release lever 32, which rotatably operates the lock lever 31. When the release lever 32 is operated so as to rotate the lock lever 31 against a spring force of the compression spring, the lock hooks 31a disengage from the corresponding second lock holes 22a, the corresponding first lock holes 15a and the corresponding third lock holes 24a. Thus, in response to the manual operation of the release lever 32 by the occupant, the lock mechanism 30, which is provided at the upper rail 20, engages/disengages to/from the corresponding second lock holes 22a, the corresponding first lock holes 15a and the corresponding third lock holes 24a by means of the lock hooks 31a, and thereby sliding of the upper rail 20 relative to the lower rail 10 is locked/released.

Each of the slide support members 40 includes retainers 41 and a plurality of balls 42. The retainers 41, made of resin, rotatably hold the plurality of balls 42, serving as rolling members. As illustrated in FIG. 4, the slide supporting members 40 are arranged between the lower rail 10 and the upper rail 20. The balls 42, which are provided at a lower side of the slide support members 40, are held at a sliding portion, which is configured by the bent portions 12 of the lower rail 10 and lower portions of the engagement wall portions 24 of the upper rail 20. Likewise, the balls 42, which are provided at an upper side of the slide support members 40, are held at a sliding portion, which is configured by the upper portions 14 of the lower rail 10 and upper portions of the engagement wall portions 24 of the upper rail 20.

As described above, the engagement wall portions 24 of the upper rail 20 engage with the corresponding first vertical wall portions 15 of the lower rail 10 via the corresponding slide support members 40. Further, the upper rail 20 is assembled to the lower rail 10 so as to be slidable in the longitudinal direction of the lower rail 10. According to a configuration of the first embodiment, the detachment prevention mechanism 4 is applied to the seat slide apparatus 1, having a front-rear slide mechanism.

The vehicle seat 3 includes the seat frame 50, the seat cushion 51, a seat belt 53, a tongue plate 54, a buckle 55, an upper belt anchorage 56 and lower belt anchorages 57 (The lower belt anchorage 57 is arranged at left and right sides of the seat frame 50). The seat frame 50 supports the seat cushion 51. The seat frame 50 includes the lower arm 52, which is fixed to the seat slide apparatus 1, at the lower portion thereof (The lower arm 52 is arranged at left and right sides of the seat frame 50). Front and rear portions of the seat frame 50 are fixed to the front and rear portions of the upper rail 20, respectively, via the lower arm 52. The lower arm 52 is formed with a second hole 52a, through which the retention pin 60 is inserted, at an upper side of the first hole 21a, which is formed at the upper wall portion 21 of the upper rail 20 so as to open therethrough.

The seat belt 53 includes a shoulder belt 53a and a lap belt 53b. An upper end of the shoulder belt 53a is supported by the upper belt anchorage 56, which is provided at an upper-rear portion of the seat frame 50. The shoulder belt 53a may be reeled in by means of a retractor, which is provided at an inside of a seat back of the seat frame 50. A lower end of the shoulder belt 53a is inserted through a belt hole of the tongue plate 54, and thereby the shoulder belt 53a is connectable to the lower belt anchorage 57, which is provided at the lower arm 52 arranged at one side of the seat frame 50, by means of the tongue plate 54 and the buckle 55. One end of the lap belt 53b, serving also as the lower end of the shoulder belt 53a, is inserted through the belt hole of the tongue plate 54. The other end of the lap belt 53b is connected to an anchorage plate, and is supported by the lower belt anchorage 57, which is provided at the lower arm 52 arranged at the other side of the seat frame 50, via the anchorage plate.

As described above, the tongue plate 54 includes the belt hole, through which the seat belt 53 is inserted. The tongue plate 54 is connectable/disconnectable to/from the buckle 55. The buckle 55 is fixed to the lower belt anchorage 57, which is fixed to the lower arm 52. Thus, the vehicle seat 3 according to the first embodiment is a belt-integrated seat, in which the upper and lower belt anchorages 56 and 57 are integrally provided at an upper-rear portion and a lower-rear portion of the seat frame 50, respectively.

The detachment prevention mechanism 4 includes the retention pin 60 (a load receiving member), the first elongated hole 11a formed at the bottom wall portion 11 of the lower rail 10 so as to open therethrough, the second elongated hole 16a, formed at the first attachment bracket 16 so as to open therethrough, the first hole 21a formed at the upper wall portion 21 of the upper rail 20 and the second hole 52a formed at the lower arm 52 of the seat frame 50.

The retention pin 60 includes a pin head portion 61 (a flange portion), a middle body portion 62, a flange nut 63, a male screw portion 64 and a stepped portion 65. The pin head portion 61 whose diameter is set to be larger than a diameter of each of the first hole 21a of the upper rail 20 and the second hole 52a of the lower arm 52, through which the middle body portion 62 of the retention pin 60 is inserted, is formed at an upper end of the retention pin 60. The retention pin 60 is fixed to the lower portion of the lower arm 52 so that the pin head portion 61 contacts an upper surface of a bottom wall portion of the lower arm 52a in the vicinity of the second hole 52a. Consequently, the retention pin 60 is fixed to the upper rail 20 via the lower arm 52.

The middle body portion 62 of the retention pin 60 is formed into a substantially cylindrical shape, which is arranged so as to extend downwardly from the pin head portion 61. The retention pin 60 includes the male screw portion 64 at a lower portion thereof and the flange nut 63 is fitted into the male screw portion 64. A diameter of the flange nut 63 is set to be larger than a shorter diameter of the first elongated hole 11a of the lower rail 10 and a shorter diameter of the second elongated hole 16a of the first attachment bracket 16, through each of which the middle body portion 62 of the retention pin 60 is inserted. At the time of assembly, a clearance is generated between the flange nut 63 and the first attachment bracket 16. Therefore, when a detachment load is applied to the upper rail 20, to which the retention pin 60 is fixed, the flange nut 63 engages with a lower surface of the first attachment bracket 16 in the vicinity of the second elongated hole 16a. Accordingly, when the detachment load is applied, the pin head portion 61 of the retention pin 60 contacts the lower arm 52 while the flange nut 63 engages with the first attachment bracket 16 in the vicinity of the second elongated hole 16a, and thereby a movement of the upper rail 20 in an upper direction is restricted. Thus, the flange nut 63 serves as a lower flange portion of the load receiving member.

A difference between a diameter of a cylindrical member 66 and a diameter of the middle body portion 62 forms the stepped portion 65 of the retention pin 60 at a lower end portion of the cylindrical member 66. The diameter of the cylindrical member 66 is set to be larger than the diameter of the middle body portion 62 and the shorter diameter of the first elongated hole 11a of the lower rail 10. According to the first embodiment, the cylindrical member 66 is connected to a lower surface of the upper wall portion 21 of the upper rail 20 by means of welding and the like, and thereby the cylindrical member 66 and the retention pin 60 is integrally provided. Accordingly, when a compression load is applied to the upper rail 20, which is fixed to the retention pin 60, the stepped portion 65 contacts an upper surface of the bottom wall portion 11 of the upper rail 10 in the vicinity of the first elongated hole 11a.

An operation of the seat slide apparatus 1 according to the first embodiment will be described hereinafter. In a case where the vehicle is hit at a front portion thereof with the occupant seated on the vehicle seat 3, the occupant is held to the vehicle seat 3 by means of the seat belt 53. Due to an inertia force of the occupant, the seat belt 53 is drawn in a front direction of the vehicle by means of a tension force, and a load is applied to the upper and lower anchorages 56 and 57. Then, the load, applied to the upper and lower anchorages 56 and 57, is transmitted to a rear side of the seat frame 50. Therefore, the load is applied to the rear side of the seat frame 50 in the upper direction while a front side of the seat frame 50 serves as a pivot point. Consequently, the detachment load is applied from the lower frame 52 to the seat slide apparatus 1 at a position immediately below the lower belt anchorage 57, which is arranged at the seat frame 50.

A portion of the detachment load is applied from the lower arm 52 to the pin head portion 61 of the retention pin 60, which contacts the upper surface of the bottom wall portion of the lower arm 52. The retention pin 60 extends through the second hole 52a of the lower arm 52, the first hole 21a of the upper rail 20, the first elongated hole 11a of the lower rail 10 and the second elongated hole 16a of the first attachment bracket 16. Therefore, the flange nut 63 of the retention pin 60 engages with the first attachment bracket 16 in the vicinity of the second elongated hole 16a, and thereby the movement of the upper rail 20 and the lower arm 52 in the upper direction is restricted. In other words, the detachment prevention mechanism 4 bears a portion of the detachment load, which is applied from the lower arm 52 to the upper rail 20, so as to restrict detachment of the upper rail 20. Further, the lower arm 52 is fixed to the pin head portion 61 of the retention pin 60. Therefore, a portion of the detachment load is directly applied to the retention pin 60. Consequently, less load is applied to the upper rail 20. Accordingly, the detachment of the lower arm 52 from the upper rail 20 is restricted.

Further, the detachment prevention mechanism 4 bears the detachment load by means of the first attachment bracket 16, which includes a larger rigidity than the bottom wall portion 11 of the lower rail 10. Therefore, a resistance load of the seat slide apparatus 1 to the detachment load may be increased. Thus, an assembly portion of the lower and upper rail 10 and 20 and the detachment prevention mechanism 4 share a burden of the detachment load. Therefore, a mechanical strength may be increased and safety may be improved.

According to the first embodiment, the first hole 21a of the upper rail 20, through which the retention pin 60 in inserted, is formed at the intermediate portion of the upper wall portion 21 of the upper rail 20 in the width direction thereof so as to open therethrough. Likewise, the first elongated hole 11a of the lower rail 10, through which the retention pin 60 is inserted, is formed at the intermediate portion of the bottom wall portion 11 of the lower rail 10 in the width direction thereof so as to open therethrough. Therefore, the retention pin 60, which includes a large tension strength, is arranged so as to extend along a substantially straight line extending from the upper rail 20, to which the detachment load is applied, to the first attachment bracket 16 of the vehicle floor side, to which the lower rail 10 is fixed. Accordingly, the detachment prevention mechanism 4 obtains a large load resistance.

Further, the detachment prevention mechanism 4 is positioned at the position immediately below the lower belt anchorage 57, which is arranged at the rear side of the seat frame 50. Therefore, the detachment load is effectively borne by means of the detachment prevention mechanism 4. Accordingly, the resistance load of the seat slide apparatus 1 to the detachment load may be increased. Further, the retention pin 60 of the detachment prevention mechanism 4 restricts the movement of the upper rail 20 in the upper direction, thereby restricting the detachment of the upper rail 20 from the lower rail 10. Therefore, the seat slide apparatus 1 may be less complex and a size of the seat slide apparatus 1 may be reduced.

Due to impact on the vehicle or a fluctuation of acceleration, a load may be applied from the lower arm 52 to the upper rail 20 toward the vehicle floor 2 in a direction where the lower and upper rails 10 and 20 are compressed. When a large compression load is applied, the seat slide apparatus 1 may be deformed so as not to slide smoothly or so that the detachment prevention mechanism 4 may not be operated appropriately. Therefore, not only the resistance load of the seat slide apparatus 1 relative to the detachment load but also a resistance load thereof relative to the compression load may be required.

According to the detachment prevention mechanism 4 of the first embodiment, the retention pin 60 includes the stepped portion 65. When the compression load is applied from the lower arm 52 to the seat slide apparatus 1, the retention pin 60 moves downwardly together with the upper rail 20. Then, the stepped portion 65 of the retention pin 60 contacts the upper surface of the lower rail 10 in the vicinity of the first elongated hole 11a. The cylindrical member 66, which forms the stepped portion 65, is integrally connected to the lower surface of the upper wall portion 21 of the upper rail 20 by means of welding and the like, so that the retention pin 60 and the cylindrical member 66 are integrally configured. The cylindrical member 66 is resistant relative to the compression load. Therefore, a clearance between the lower and upper rails 10 and 20 may be maintained.

Thus, a portion of the compression load, applied to the seat slide apparatus 1, is supported by means of the stepped portion 65. Therefore, a deformation of the lower and upper rails 10 and 20 may be restricted. Accordingly, the resistance load of the seat slide apparatus 1 relative to the detachment load and a resistance load thereof relative to the compression load may be increased.

Modified Embodiment of First Embodiment

According to the first embodiment, the vehicle seat 3 includes the seat frame 50 having the lower arm 52, and the lower arm 52 is positioned at an upper portion of the upper rail 20, to which the detachment prevention mechanism 4 is provided. However, a lateral side mechanism or a seat rotation disc may be arranged at an upper portion of the upper rail 20 between the vehicle seat 3 and the upper rail 20. In such case, the lateral side mechanism or the seat rotation disc is arranged at a lower portion of the seat frame 50 while the upper rail 20 is fixed to the lateral side mechanism or the seat rotation disc via a bracket and a lateral lower rail of the lateral slide mechanism or a rotation disc lower rail of the seat rotation disc.

Second Embodiment

Figure 5:
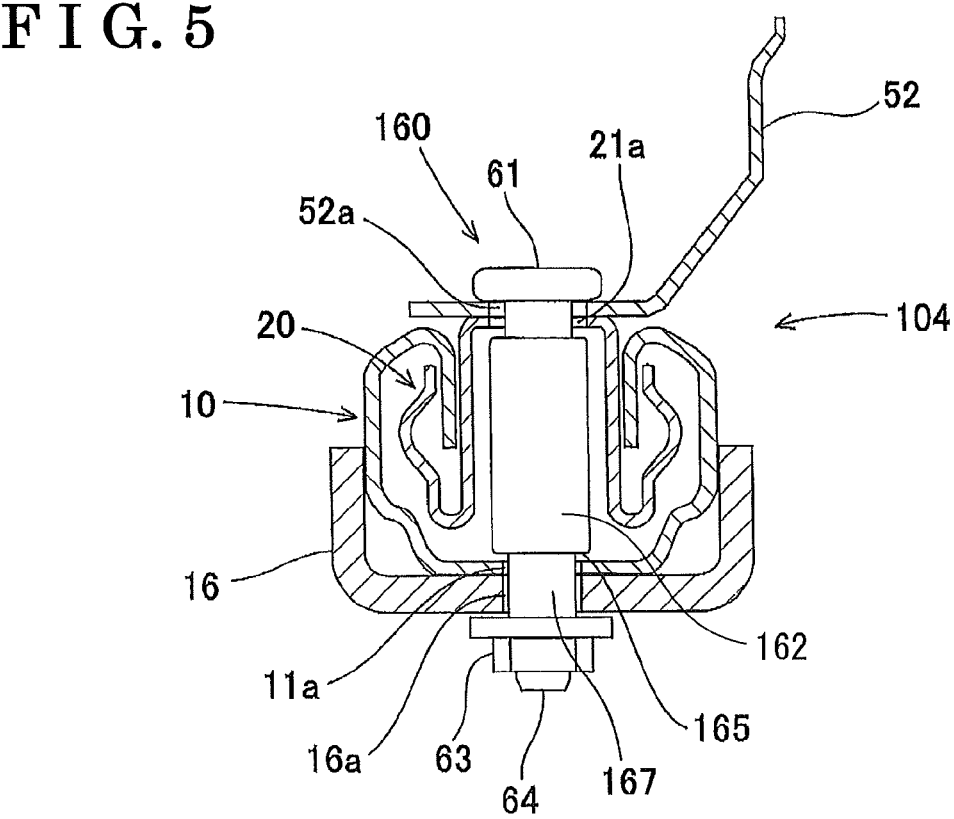
FIG. 5 is a cross-sectional view illustrating a lower rail and an upper rail according to a second embodiment.

An detachment prevention mechanism 104 according to a second embodiment will be described hereinafter with reference to FIG. 5. Left and right sides of the seat slide apparatus 1 include substantially the same configuration and function. Therefore, only one side of the seat slide apparatus 1 will be mainly described hereinafter. As illustrated in FIG. 5, the detachment prevention mechanism 104 includes a retention pin 160, the first elongated hole 11a formed at the bottom wall portion 11 of the lower rail 10 so as to open therethrough, the second elongated hole 16a formed at the first attachment bracket 16 so as to open therethrough, the first hole 21a formed at the upper wall portion 21 of the upper rail 20 so as to open therethrough and the second hole 52a formed at the lower arm 52 of the vehicle seat 3 so as to open therethrough. The detachment prevention mechanism 104 according to the second embodiment differs from the detachment prevention mechanism 4 according to the first embodiment in that a shape of the stepped portion 65 of the detachment prevention mechanism 4 is modified. Other configurations of the detachment prevention mechanism 104 are similar to configurations of the detachment prevention mechanism 4. Therefore, a detailed description will be omitted and only differences will be described hereinafter.

The retention pin 160 includes the pin head portion 61, a middle body portion 162, a small diameter portion 167, the flange nut 63, the male screw portion 64 and a stepped portion 165. According to the first embodiment, the cylindrical member 66 is connected to the lower surface of the upper wall portion 21 of the upper rail 20 by means of welding and the like so as to form the stepped portion 65 of the retention pin 60. The difference between the diameter of a cylindrical member 66 and the diameter of the middle body portion 62 forms the stepped portion 65 of the retention pin 60 at the lower end portion of the cylindrical member 66. On the other hand, according to the second embodiment, a difference between a diameter of the middle body portion 162 and the diameter of the small diameter portion 167 forms the stepped portion 165.

The middle body portion 162 extends to a portion slightly higher than the upper surface of the bottom wall portion 11 of the lower rail 10. The diameter of the middle body portion 162 is set to be larger than the shorter diameter of the first elongated hole 11a of the lower rail 10.

Accordingly, the detachment prevention mechanism 104 according to the second embodiment achieves substantially the same effect as the detachment prevention mechanism 4 according to the first embodiment. Further, the detachment prevention mechanism 104 according to the second embodiment does not include the cylindrical member 66 for forming the stepped portion 65. Therefore, a configuration of the upper rail 20 is simplified and a weight of the upper rail 20 is reduced. The retention pin 160, which includes a large resistance load relative to the compression load, may be applied to the seat slide apparatus 1, which may obtain a large compression load.

Modified Embodiment of First and Second Embodiments

According to the first embodiment, the pin head portion 61 of the retention pin 60 is fixed to the lower arm 52. Likewise, according to the second embodiment, the pin head portion 61 of the retention pin 160 is fixed to the lower arm 52. On the other hand, according to the modified embodiment of the first and second embodiments, the pin head portion 61 may be directly fixed to the upper rail 20 so that the pin head portion 61 contacts the upper surface of the upper wall portion 21 of the upper rail 20 in the vicinity of the first hole 21a. When the detachment load is applied to the seat slide apparatus 1, the retention pin 60 or the retention pin 160 engages with the lower surface of the first attachment bracket 16 in the vicinity of the second elongated hole 16a, thereby restricting the movement of the upper rail 20 in the upper direction. At that time, a portion of the detachment load is transmitted directly from the upper rail 20, which is fixed to the lower arm 52, to the pin head portion 61 of the retention pin 60 or the pin head portion 61 of the retention pin 160. The lower arm 52 is not arranged between the upper rail 20 and the pin head portion 61. Therefore, the resistance load relative to the detachment load may be increased while structural limitations are reduced and complexity of configuration of the seat slide apparatus 1 is reduced.

According to the first and second embodiments, the stepped portion 65 or 165 is integrally formed with the retention pin 60 or 165, respectively. However, a cylindrically-shaped member may be provided separately from the retention pin 60 or the retention pin 160 so as to freely engage with the middle body portion 62 or 162. In such case, a difference between a diameter of a lower end portion of the cylindrically-shaped member and the diameter of the middle body portion 62 or 162 of the retention pin 60 or 162 forms a stepped portion. Thus, a detachment prevention mechanism according to the modified embodiment of the first and second embodiments may obtain substantially the same effect as the detachment prevention mechanism 4 or 104 according to the first and second embodiments. Further, because a shape of each of the components is simplified, effects substantially the same as the first and second embodiments may be obtained at a lower cost. However, in order to achieve a quiet and safe operation of the seat slide apparatus 1, the stepped portion 65 or 165 is provided integrally with the retention pin 60 or 165.

Third Embodiment

Figure 6:
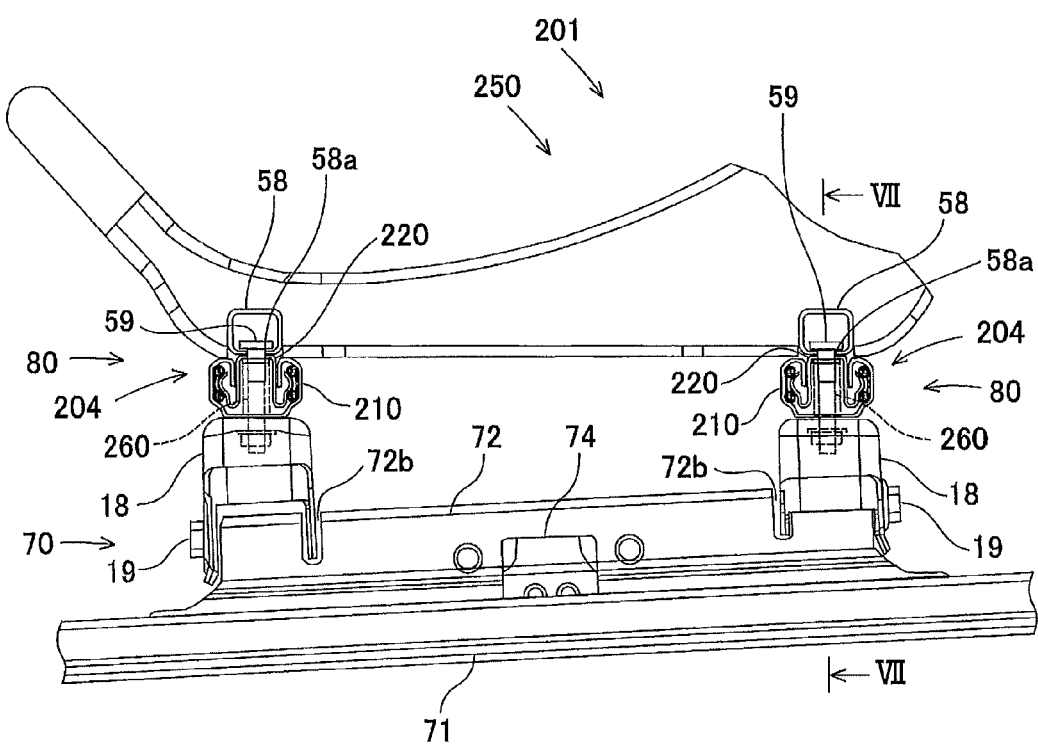
FIG. 6 is a side view illustrating a front-rear slide mechanism and a lateral slide mechanism according to a third embodiment.
Figure 7:
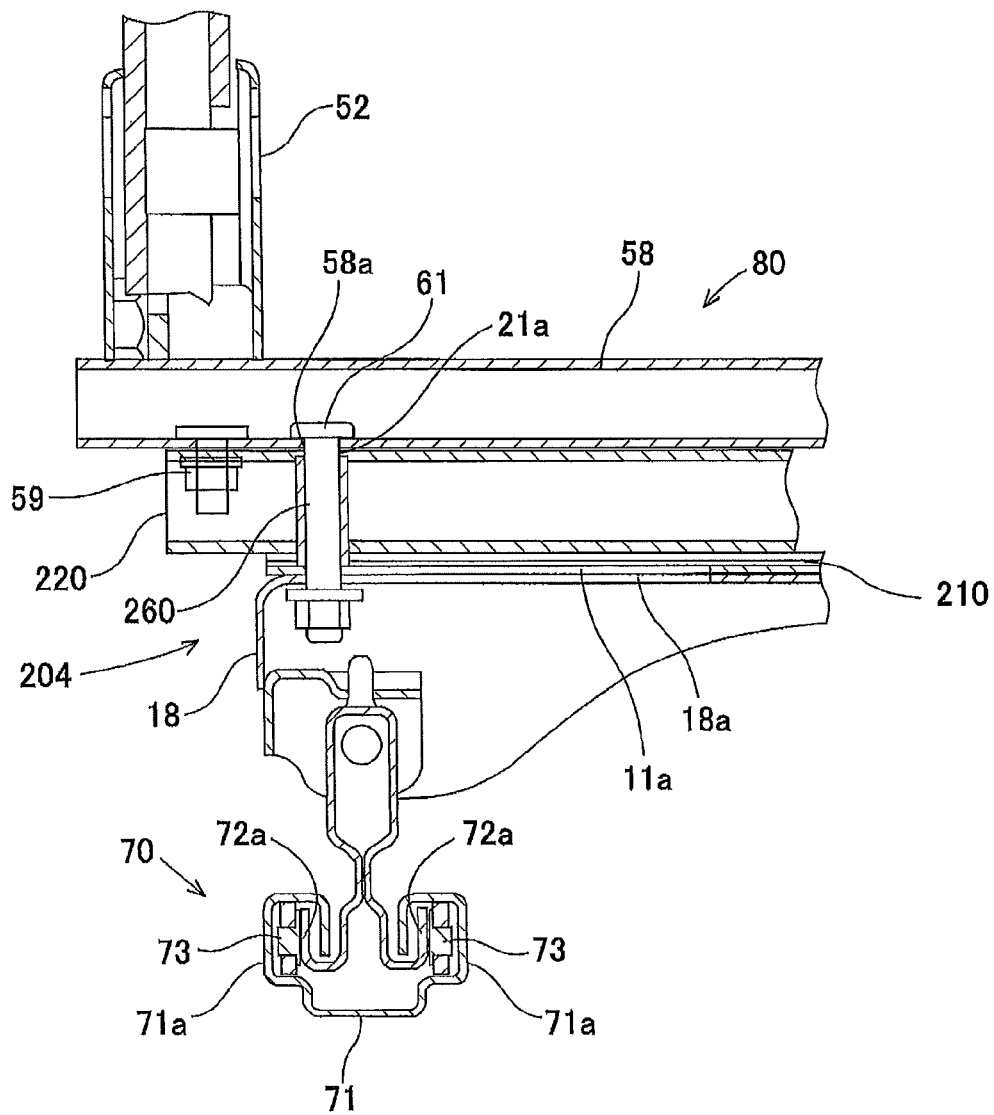
FIG. 7 is a cross-sectional view taken along line VII-VII in FIG. 6 according to the third embodiment.
Figure 8:
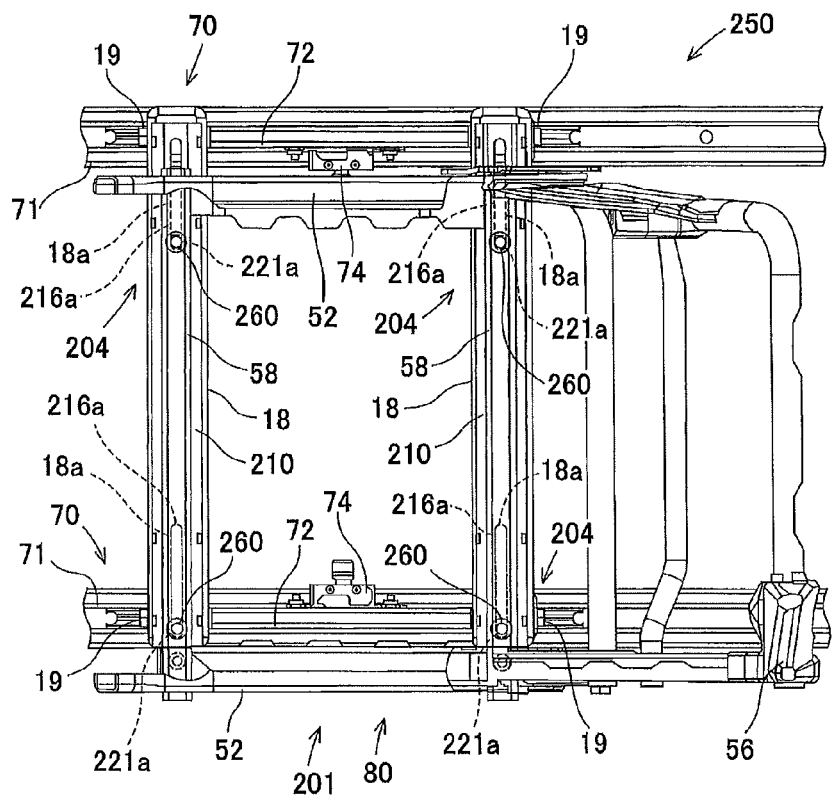
FIG. 8 is a planar view illustrating a seat slide apparatus for a vehicle according to the third embodiment.

A seat slide apparatus 201 for a vehicle (which will be referred to as a seat slide apparatus 201 hereinafter) according to a third embodiment will be described hereinafter with reference to FIGS. 6 to 8. FIG. 6 is a side view illustrating a front-rear slide mechanism 70 and a lateral slide mechanism 80. As illustrated in FIGS. 6, 7 and 8, the seat slide apparatus 201 includes the lateral slide mechanisms 80 at an upper portion of the front-rear slide mechanism 70. The lateral slide mechanism 80 respectively includes detachment prevention mechanisms 204.

The front-rear slide mechanism 70 include a pair of front-rear lower rails 71, which is fixed to the vehicle floor 2 so as to extend in the front-rear direction of the vehicle, and a pair of front-rear upper rails 72, which is slidably supported by means of the front-rear lower rails 71. As illustrated in FIG. 7, each of the front-rear lower rails 71, formed into a substantially U shape when seen in a cross-sectional view, includes side wall portions 71a, which respectively extend from ends of a bottom wall portion in the upper direction. The front-rear lower rails 71 are fixed to the vehicle floor 2 by means of a connecting means. Each of the font-rear upper rails 72, formed into a substantially T shape when seen in a cross-sectional view, includes flange portions 72a, which are formed by bending ends of the front-rear upper rail 72 in the upper direction. Each of the front-rear upper rails 72 is accommodated within each of the front-rear lower rails 71 so that outer surfaces of the flange portions 72a of the front-rear upper rail 72 face corresponding inner surfaces of the side wall portions 71a of the front-rear lower rail 71. A plurality of rolling members 73 are arranged between the inner surfaces of the side wall portions 71a of each of the front-rear lower rails 71 and the outer surfaces of the flange portions 72a of each of the front-rear upper rails 72 so as to include a predetermined interval between the adjacent rolling members 73 in a longitudinal direction of the front-rear lower and upper rails 71 and 72. The front-rear upper rails 72 are supported by the front-rear lower rails 71 via the rolling members 73 so as to be movable in the longitudinal direction of the front-rear lower and upper rails 71 and 72 (in the front-rear direction of the vehicle). The front-rear upper rails 72 slide relative to the front-rear lower rails 71 so as to adjust a position of the vehicle seat 3 in the front-rear direction of the vehicle, and then the front-rear upper rails 72 are locked to the corresponding front-rear lower rails 71 at a predetermined position in the front-rear direction of the vehicle by means of a lock mechanism 74.

Each of the front-rear upper rails 72 is formed with slits 72b, whose upper ends are open, at portions higher than a sliding portion, where the front-rear upper rail 72 slides relative to the front-rear lower rail 71, so as to include a predetermined interval between each ends of the front-rear upper rail 72 and each of the slits 72b. First attachment brackets 18 (an attachment bracket portion) are inserted into to the slits 72b of the front-rear upper rails 72 from the upper direction. Each of the first attachment brackets 18 is formed into a longitudinal member whose cross section is a substantially U shape. Each of the first attachment brackets 18 is arranged to extend between front ends or between rear ends of the pair of front-rear upper rails 72, which face each other. Each of the first attachment brackets 18 includes engagement portions, which extend downwardly from ends of the first attachment bracket 18 in a width direction thereof. The engagement portions of each of the first attachment brackets 18 are respectively inserted into the slits 72b of the front-rear upper rails 72, and then fixing bolts 19 are screwed into nut members, which are provided at an upper portion of the front-rear upper rail 72. Thus, the engagement portions of each of the first attachment brackets 18 are fixed to the pair of front-rear upper rails 72 by means of the fixing bolts 19, which are respectively fixed to the front-rear upper rails 72, so that each of the first attachment brackets 18 is assembled to the pair of front-rear upper rails 72 at both ends of each of the first attachment brackets 18. One of the first attachment brackets 18, which is provided at a rear side of the vehicle, is fixed to the front-rear upper rails 72 by means of the fixing bolts 19. Further, as illustrated in FIG. 8, each of the first attachment brackets 18 is formed with a pair of second elongated holes 18a, which extend in the longitudinal direction of the front-rear upper and lower rails 71 and 72 (in the width direction of the vehicle), at an intermediate portion of an upper wall portion thereof in the width direction of the first attachment bracket 18 (in the front-rear direction of the vehicle). Furthermore, attachment holes, for attaching each of a pair of lower rails 210, are formed at the upper wall portion of each of the first attachment brackets 18.

The lateral slide mechanism 80 includes the pair of lower rails 210, which are formed into a longitudinal shape, and which are fixed to the corresponding first attachment brackets 18 so as to be in parallel therewith and so as to extend in the width direction of the vehicle, and a pair of upper rails 220, which are slidably supported by the lower rails 210 and which are fixed to a seat frame 250 of the vehicle. The lower rails 210 are fixed to the front-rear upper rails 72 (a vehicle floor side) via the first attachment brackets 18 so that a longitudinal direction of the lower rails 210 corresponds the width direction of the vehicle. The lower rails 210 and the upper rails 220 according to the third embodiment are substantially the same as the lower rails 10 and the upper rails 20 according to the first embodiment, respectively, which are arranged so as to extend in the width direction of the vehicle. Therefore, detailed description of the upper and lower rails 210 and 220 will be omitted.

The seat frame 250, which corresponds to the seat frame 50 of the first embodiment, includes cross members 58 and fixing members 59. As illustrated in FIG. 6, the cross members 58 are longitudinal members, each of which is formed into a substantially rectangular pipe shape. The cross members 58 are connected to the lower arms 52 by means of welding and the like so as to extend at a lower portion of the lower arms 52. The cross members 58 are connected to the corresponding upper rails 220 by means of the fixing members 59 so that bottom wall portions of the cross members 58 and the corresponding upper wall portions 21 of the upper rails 220 contact each other.

The detachment prevention mechanisms 204, respectively arranged at both end portions of the lateral slide mechanism 80 in the longitudinal direction thereof, include substantially the same configurations and functions. Therefore, only one of the detachment prevention mechanisms 204 will be described hereinafter. Further, left and right sides of the seat slide apparatus 201 include substantially the same configuration and function. Therefore, only one side of the seat slide apparatus 201 will be mainly described hereinafter. The detachment prevention mechanism 204 includes a retention pin 260, the first elongated hole 11a, which is formed at the bottom wall portion 11 of the lower rail 210 so as to open therethrough, the second elongated hole 18a, which is formed at the first attachment bracket 18 so as to open therethrough, the first hole 21a, which is formed at the upper wall portion 21 of the upper rails 220 so as to open therethrough, and a second hole 58a, which is formed at the cross member 58 of the seat frame 250 so as to open therethrough. The retention pin 260 according to the third embodiment is substantially the same as the retention pin 60 according to the first embodiment. Therefore, detailed description of the retention pin 260 will be omitted. As illustrated in FIG. 7, the first elongated hole 11a of the bottom wall portion 11 of the lower rail 210 is formed so as to correspond the second elongated hole 18a of the first attachment bracket 18. As illustrated by a dashed line in FIG. 8, the first and second elongated holes 11a and 18a extend in the width direction of the vehicle. Likewise, the second hole 58a of the cross member 58 is formed so as to correspond to first hole 221a of the upper rail 220. The pin head portion 61 of the retention pin 260 is fixed to the cross member 58 so that the pin head portion 61 contacts the cross member 58 in the vicinity of the second hole 58a.

According to the third embodiment, as described above, the detachment prevention mechanism 204 is applied to the lateral slide mechanism 80. In a case where the vehicle, to which the seat slide apparatus 201 having the front-rear slide mechanism 70 and the lateral side mechanism 80 is applied, is hit, a detachment load is applied from the cross member 58, which is fixed to the lower portion of the seat frame 250, to the seat slide apparatus 201. At that time, the detachment prevention mechanism 204 may achieve substantially the same effect as the first embodiment. More specifically, the detachment prevention mechanism 204 bears a portion of the detachment load, which is applied from the cross member 58 to the seat slide apparatus 201, so as to restrict detachment of the upper rail 220. Further, the cross member 58 is fixed to the pin head portion 61 of the retention pin 260. Therefore, a portion of the detachment load is directly applied to the retention pin 260. Consequently, less load is applied to the upper rail 220. Accordingly, the detachment of the cross member 58 from the upper rail 220 is restricted.

Further, the detachment prevention mechanism 204 bears the detachment load by means of the first attachment bracket 18, which includes larger rigidity than the bottom wall portion 11 of the lower rail 210. Therefore, a resistance load of the seat slide apparatus 201 to the detachment load may be increased. Thus, an assembly portion of the lower and upper rail 210 and 220 and the detachment prevention mechanism 204 share a burden of the detachment load. Therefore, a mechanical strength may be increased and safety may be improved.

Modified Embodiment of Third Embodiment

Figure 9:
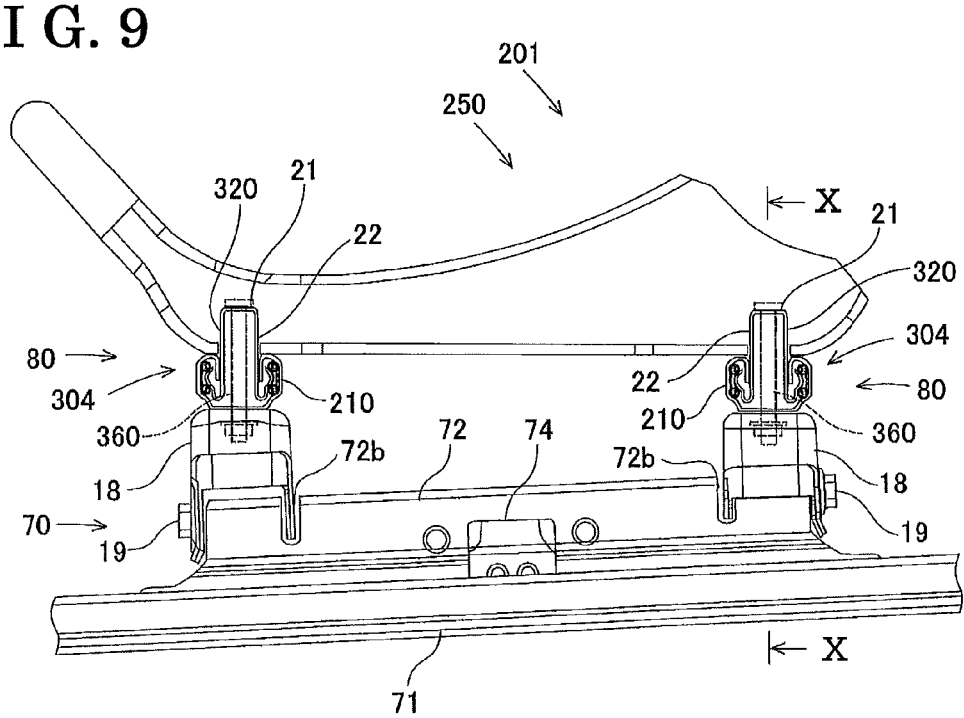
FIG. 9 is a side view illustrating a front-rear slide mechanism and a lateral slide mechanism according to a modified embodiment of the third embodiment.

According to the third embodiment, the upper rail 220 is fixed to the cross member 58, which extends at the lower portion of the seat frame 250. However, the upper rail 220 and the cross member 58 may be integrally formed. Such configuration will be described hereinafter with reference to FIGS. 9 and 10.

According to a modified embodiment of the third embodiment, the second vertical wall portions 22 of an upper rail 320 of the lateral slide mechanism 80 are elongated in the upper-lower direction of the vehicle, and thereby the upper wall portion 21 of the upper rail 320 is formed to be substantially the same height as a height of the cross member 58 according to the third embodiment. The upper wall portion 21 and the second vertical wall portions 22 are connected to the lower portion of the lower arm 52 of the seat frame 250 by means of welding and the like. The middle body portion 62 of a retention pin 360 of a detachment prevention mechanism 304 extends in the upper-lower direction of the vehicle, and the pin head portion 61 of the retention pin 360 contacts the upper wall portion 21 of the upper rail 320 in the vicinity of the first hole 21a.

According to the above-described configuration, effects similar to the third embodiment may be achieved. Further, the cross member 58 and the connecting member 59 for connecting the cross member 58 and the upper rail 220 are not provided. Therefore, the number of components is reduced.

Other Embodiments

According to the first to third embodiments, the upper belt anchorage 56 and the lower belt anchorages 57 for supporting the end portions of the seat belt 53 are arranged at the seat frame 50 or 250, thereby providing a belt-integrated seat. However, the upper belt anchorage 56 and the lower belt anchorages 57 may be arranged at a body frame of the vehicle. According to such configuration also, in a case where the vehicle is hit, the detachment load may be applied to the seat slide apparatus 1 or 201. Therefore, the detachment prevention mechanisms 4, 104, 204 or 304 may be applied to the seat slide apparatus 1 or 201 so as to achieve similar effects.

According to the first to third embodiments, the lower end of the shoulder belt 53a and one end of the lap belt 53b are connectable to one of the lower belt anchorages 57 by means of the tongue plate 54 and the buckle 55. The other end of the lap belt 53b is supported by the other one of lower belt anchorage 57 via the anchorage plate. The lower belt anchorages 57 are fixed to the corresponding upper rails 20 or 220 via the lower arms 52. The detachment prevention mechanisms 4, 104, 204 or 304 is applied to the seat slide apparatus 1 or 201, having the lower rails 10 or 210 and the upper rails 20, 220 or 320, so as to bear the detachment load, applied to left and right sides of the upper rails 20, 220 or 320. However, a large detachment load may be applied to only one side of the seat slide apparatus 1 or 201, where the lower end of the shoulder belt 53a and one end of the lap belt 53b are supported. In such a case, the detachment prevention mechanisms 4, 104, 204 or 304 may be provided at only one of the upper rails 20, 220 or 320, at which the buckle 55 is provided. Accordingly, a configuration of the detachment prevention mechanism 4, 104, 204 or 304 may be provided only at one side of the seat slide apparatus 1 or 201. Therefore, a cost may be reduced and a resistance load relative to the detachment load may be increased effectively.

According to the first to third embodiments, the load receiving member 60, 160, 260 or 360 is a pin member, which is formed into a substantially cylindrical shape. However, a load receiving member may be formed into a different shape so as to include a substantially elliptical shape or a rectangular shape when seen in a cross-sectional view taken in an orthogonal direction to an axial direction thereof. Consequently, the seat slide apparatus 1 or 201 may be configured so that the load receiving member is appropriately applied relative to the detachment load and the compression load, each of which may fluctuate according to a usage of the seat slide apparatus 1 or 201.

According to the first to third embodiments, when the detachment load is applied to the upper rail 20, 220 or 320, at which the retention pin 60, 160, 260 or 360 is fixed, the flange nut 63 of the retention pin 60, 160, 260 or 360 engages with the lower surface of the first attachment bracket 16 or 18 in the vicinity of the second elongated hole 16a or 18a. However, the first attachment bracket 16 or 18 is not necessarily provided, and the flange nut 63 of the retention pin 60, 160, 260 or 360 may directly engage with the lower surface of the bottom wall portion 11 of the lower rail 10 or 210 in the vicinity of the first elongated hole 11a when the detachment load is applied to the upper rail 20, 220 or 320, at which the retention pin 60, 160, 260 or 360 is fixed.

Accordingly, the resistance load of the seat slide apparatus 1 or 201 relative to the detachment load, applied to the upper rail 20, 220 or 320, may be increased. More specifically, when the detachment load is applied to the upper rail 20, 220 or 320, the retention pin 60, 160, 260 or 360 engages with the bottom wall portion 11 of the lower rail 10 or 210 in the vicinity of the elongated hole 11a so as to restrict the movement of the upper rail 20, 220 or 320 in the upper direction, and thereby the detachment of the upper rail 20, 220 or 320 is restricted. Known lower and upper hooks are not provided at lower and upper rails, respectively. Therefore, the configuration of the seat slide apparatus 1 or 201 becomes less complex, and a size thereof is reduced.

Further, the first hole 21a and the first elongated hole 11a, through which the retention pin 60, 160, 260 or 360 extends, are formed at the upper wall portion 21 of the upper rail 20, 220 or 320 and the bottom wall portion 11 of the lower rail 10 or 210, respectively. Therefore, the retention pin 60, 160, 260 or 360, which includes a large tension strength, is arranged so as to extend along a substantially straight line extending from the upper rail 20 or 220, to which the detachment load is applied, to the vehicle floor 2, to which the lower rail 10 or 210 is fixed. Accordingly, the resistance load of the detachment prevention mechanism 4, 104, 204 or 304 may be increased.

Furthermore, the retention pin 60, 160, 260 or 360 is engageable with the bottom wall portion 11 of the lower rail 10 or 210 in the vicinity of the first elongated hole 11a, which is formed at the bottom wall portion 11 of the lower rail 10 or 210 so as to open therethrough. Further, the retention pin 60, 160, 260 or 360 is normally movable in the longitudinal direction of the first elongated hole 11a in a state where the retention pin 60, 160, 260 or 360 extends through the bottom wall portion 11 of the lower rail 10 or 210. In other words, the retention pin 60, 160, 260 or 360 is movable integrally with the upper rail 20, 220 or 320 in the longitudinal direction of the first elongated hole 11a during a seat slide operation while the retention pin 60, 160, 260 or 360 engages with the bottom wall portion 11 of the lower rail 10 or 210 in the vicinity of the first elongated hole 11a so as to restrict the movement of the upper rail 20, 220 or 320 in the upper direction when the detachment load is applied.

According to the first to third embodiments, the seat frame 50 or 250 includes the upper belt anchorage 56 arranged at the upper-rear portion thereof so as to support the upper end of the seat belt 53, and the lower belt anchorages 57 arranged at the lower-rear portion of the seat frame 50 or 250 so as to support the lower end of the seat belt 53. The retention pin 60, 160, 260 or 360 is fixed to the upper wall portion 21 of the upper rail 20, 220 or 320 so as to be positioned at a position immediately below the lower belt anchorages 57.

Accordingly, the seat slide apparatus 1 or 201 includes the belt-integrated seat, in which the upper and lower belt anchorages 56 or 57 for connecting and supporting upper and lower ends of the seat belt 53, respectively, are arranged at the rear side of the seat frame 50 or 250. The resistance load relative to the detachment load, applied to the upper rail 20, 220 or 320 may be increased.

Further, the upper end of the seat belt 53 is supported by the upper belt anchorage 56, provided at the upper-rear portion of the seat frame 50 or 250 and the lower end of the seat belt 53 is supported by the lower belt anchorage 57, provided at the lower-rear portion of the seat frame 50 or 250. In a case where the vehicle is hit, an impact force, applied to the seat belt 53 for restraining the occupant to the vehicle seat 3, is transmitted through the upper and lower anchorages 56 and 57 to the rear side of the seat frame 50. Therefore, the rear side of the seat frame 50 receives the load in the upper direction while the front side of the seat frame 50 serves as a pivot point. The detachment prevention mechanism 4, 104, 204 or 304, which includes a large resistance load, is arranged at the position immediately below the lower belt anchorage 57. Therefore, the resistance load of the seat slide apparatus 1 or 201 relative to the detachment load may be effectively increased.

According to first to third embodiments, the retention pin 60, 160, 260 or 360 is inserted through the first hole 21a or 221a and the second hole 52a or 58a, formed at the upper wall portion 21 of the upper rail 20, 220 or 320 and the lower portion of the seat frame 50 or 250, respectively, so as to open therethrough. The retention pin 60, 160, 260 or 360 includes the pin head portion 61 at the upper end thereof, the pin head portion 61 contacting the lower portion of the seat frame 50 or 250 in the vicinity of the second hole 52a or 58a, provided at the lower portion of the seat frame 50 or 250, so as to restrict the movement of the upper rail 20, 220 or 320 in the upper direction.

Accordingly, the resistance load relative to the detachment load, applied to the lower and upper rails 10 or 210 and 20, 220 or 320, may be surely increased. The retention pin 60, 160, 260 or 360 is inserted through the first hole 21a or 221a and the second hole 52a or 58a, formed at the upper wall portion 21 of the upper rail 20, 220 or 320 and the lower portion of the seat frame 50 or 250, respectively, so as to open therethrough. The retention pin 60, 160, 260 or 360 is fixed to the lower portion of the seat frame 50 or 250 so that the pin head portion 61 contacts the upper surface of the bottom wall portion of the lower portion of the seat frame 50 or 250 in the vicinity of the second hole 52a or 58a. When the detachment load is applied, the pin head portion 61 of the retention pin 60, 160, 260 or 360 contacts the upper surface of the bottom wall portion of the lower portion of the seat frame 50 or 250 and the lower end portion of the retention pin 60, 160, 260 or 360 engages with the bottom wall portion 11 of the lower rail 10 or 210 in the vicinity of the first elongated hole 11a so as to restrict the movement of the upper rail 20, 220 or 320 in the upper direction. Consequently, for example, when the lower belt anchorage 57 is fixed to the lower portion of the seat frame 50 or 250, a portion of the detachment load is transmitted from the seat frame 50 or 250 to the lower rail 10 or 210 via the retention pin 60, 160, 260 or 360. The detachment load relative to the upper rail 20, 220 or 320, applied to a portion where the lower and upper rails 10 or 210 and 20, 220 or 320 engage with each other, is borne by means of the retention pin 60, 160, 260 or 360. Accordingly, the detachment of the upper rail 20, 220 or 320 from the lower rail 10 or 210 may be restricted while the detachment of the lower portion of the seat frame 50 or 250 from the upper rail 20, 220 or 320 may be also restricted.

According to the modified embodiment of the first and second embodiment and the modified embodiment of the third embodiment, the retention pin 60, 160, 260 or 360 is inserted through the first hole 21a or 221a, formed at the upper wall portion 21 of the upper rail 20, 220 or 320 so as to open therethrough. The retention pin 60, 160, 260 or 360 includes the pin head portion 61 at an upper end thereof, the pin head portion 61 contacting the lower portion of the seat frame 50 or 250 in the vicinity of the first hole 21 or 221a so as to restrict the movement of the upper rail 20, 220 or 320 in the upper direction.

Accordingly, the resistance load relative to the detachment load, applied to the lower and upper rails 10 or 210 and 20 or 320, may be surely increased. The retention pin 60, 160 or 360 is inserted through the first hole 21a or 221a, formed at the upper wall portion 21 of the upper rail 20 or 320 so as to open through. The retention pin 60, 160 or 360 is fixed to the upper rail 20 or 320 so that the pin head portion 61 contacts the upper surface of the upper wall portion 21 of the upper rail 20 or 320 in the vicinity of the hole 21a or 221a. When the detachment load is applied, the pin head portion 61 of the retention pin 60, 160 or 360 contacts the upper wall portion 21 of the upper rail 20 or 320 and the lower end portion of the retention pin 60, 160 or 360 engages with the bottom wall portion 11 of the lower rail 10 or 210 in the vicinity of the first elongated hole 11a so as to restrict the movement of the upper rail 20 or 320 in the upper direction. Consequently, a portion of the detachment load is transmitted from the upper rail 20 or 320, which is fixed to the lower portion of seat frame 50 or 250, to the lower rail 10 or 210 via the retention pin 60, 160 or 360. Accordingly, the detachment of the upper rail 20 or 320 from the lower rail 10 or 210 may be restricted. An increase of the resistance load relative to the detachment load may be achieved in the seat slide apparatus 1 or 201 whose configuration is less complex.

According to the first to third embodiments, the retention pin 60, 160, 260 or 360 integrally or separately includes the stepped portion 65 or 165 contacting an upper surface of the lower rail 10 or 210 in the vicinity of the elongated hole 11a when the compression load is applied to the lower portion of the seat frame 50 or 250 in a lower direction.

Accordingly, the resistance load relative to the compression load, applied to the lower and upper rails 10 or 210 and 20, 220 or 320, may be increased. According to the seat slide apparatus 1 or 201 of the first to third embodiments, the upper rail 20, 220 or 320 is assembled to the lower rail 10 or 210 so as to be movable in the longitudinal direction thereof. Further, due to impact on the vehicle or a fluctuation of acceleration, the compression load and the detachment load may be applied to the lower and upper rails 10 or 210 and 20, 220 or 320. According to the first to third embodiments, the retention pin 60, 160, 260 or 360 integrally or separately includes the stepped portion 65 or 165. When the compression load is applied to the upper rail 20, 220 or 320, the stepped portion 60 or 160 contacts the upper surface of the bottom wall portion 11 of the lower rail 10 or 210, thereby a clearance between the lower and upper rails 10 or 210 and 20, 220 or 320, may be maintained. Consequently, the compression load is borne by means of the stepped portion 65 or 165 and a deformation of the lower and upper rails 10 or 210 and 20, 220 or 320, may be restricted. Thus, a portion of the compression load, applied to the lower portion of the seat frame 50 or 250, is supported by means of the stepped portion 65 or 165. The resistance load of the seat slide apparatus 1 or 201 relative to the detachment load and the resistance load of the seat slide apparatus 1 or 201 relative to the compression load may be increased.

According to the first to third embodiments, the lower rail 10 or 210 includes the first attachment bracket portion 16 or 18 adapted to be fixed to the vehicle floor 2 at the lower surface of the bottom wall portion 11 of the lower rail 10 or 210. The elongated hole 11a includes the first elongated hole 11a and the second elongated hole 16a or 18a formed at the bottom wall portion 11 of the lower rail 10 or 210 and the first attachment bracket portion 16 or 18, respectively, so as to open therethrough.

Accordingly, the resistance load relative to the detachment load, applied to the lower and upper rails 10 or 210 and 20, 220 or 320, may be further increased. The second elongated hole 16a of the retention pin 60, 160, 260 or 360 extends through the first attachment bracket 16 or 18 fixed to the lower rail 10 or 210. More specifically, the first and second elongated holes 11a and 18a of the retention pin 60, 160, 260 or 360 extend through both of the bottom wall portion 11 of the lower rail 10 or 210 and the first attachment bracket 16 or 18. Therefore, when the detachment load is applied, the retention pin 60, 160, 260 or 360 engages with the lower surface of the first attachment bracket 16 or 18 in the vicinity of the second elongated hole 16a or 18a so as to restrict the movement of the upper rail 20, 220 or 320 in the upper direction. At that time, a portion of the detachment load is transmitted to the first attachment bracket 16 or 18, fixed to the lower rail 10 or 210, by means of the retention pin 60, 160, 260 or 360. Therefore, smaller amount of the detachment load is applied to the portion where the lower and upper rails 10 or 210 and 20, 220 or 320 engage with each other, and thereby the detachment of the upper rail 20, 220 or 320 may be restricted. Further, the retention pin 60, 160, 260 or 360 engages with the first attachment bracket 16 or 18, which includes a larger rigidity than the bottom wall portion 11 of the lower rail 10 or 210, so as to bear the detachment load. Therefore, the resistance load of the seat slide apparatus 1 or 201 to the detachment load may be increased.

According to the first to third embodiments, the lower rail 10 or 210 is adapted to be fixed to the vehicle floor 2 so that the longitudinal direction thereof corresponds to a front-rear direction of the vehicle.

Accordingly, the upper rail 20, 220 or 320 is assembled to the lower rail 10 or 210 so as to be relatively movable in the front-rear direction of the vehicle. In other words, the detachment prevention mechanism 4, 104, 204 or 304 may be applied to the seat slide apparatus 1 or 201 including a front-rear slide mechanism. When the detachment prevention mechanism 4, 104, 204 or 304 is applied to the front-rear slide mechanism, the resistance load may be increased relative to the detachment load, generated by an impact at the time of collision of the vehicle at a front portion thereof.

According to the third embodiment, the seat slide apparatus 1 or 201 for the vehicle further includes a front-rear slide mechanism 70 including the front-rear lower rail 71 adapted to be fixed to the vehicle floor 2 so as to extend in the front-rear direction of the vehicle, and the front-rear upper rail 72 assembled to the front-rear lower rail 71 so as to be relatively movable in the front-rear direction of the vehicle. The lower rail 210 is fixed to the front-rear upper rail 72 so that the longitudinal direction thereof corresponds to a width direction of the vehicle.

Accordingly, the seat slide apparatus 201 includes the front-rear slide mechanism 70, and the lower rail 210 is fixed to the front-rear upper rail 72 so that the longitudinal direction of the lower rail 210 corresponds to the width direction of the vehicle. The upper rail 220 or 320 is assembled to the lower rail 210 so as to be relatively movable in the width direction of the vehicle. Accordingly, the detachment prevention mechanism 204 or 304 is applied to the seat slide apparatus 201 including the lateral slide mechanism 80, and similar effects may be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle comprising:
a lower rail, formed into a longitudinal shape, adapted to be fixed to a vehicle floor and including a bottom wall portion which extends horizontally, side wall portions which extend upwardly from both ends of the bottom wall portion in a width direction thereof and first vertical wall portions which are bent downwardly at ends of the corresponding side wall portions;
an upper rail adapted to be fixed to a lower portion of a seat frame for supporting a seat cushion, including an upper wall portion which extends horizontally, second vertical wall portions which extend downwardly from both ends of the upper wall portion in a width direction thereof and engagement wall portions which are bent upwardly at ends of the second vertical wall portions, thereby engaging with the corresponding first vertical wall portions, and assembled to the lower rail so as to be relatively movable in a longitudinal direction of the lower rail; and
a detachment prevention mechanism including an elongated hole, which is formed at the bottom wall portion so as to open therethrough and which extends in the longitudinal direction of the lower rail, and a load receiving member whose upper end portion is directly or indirectly fixed to the upper wall portion of the upper rail and whose lower end portion is inserted downwardly through the elongated hole so as to be movable in an extending direction of the elongated hole, and is engageable with the bottom wall portion of the lower rail in the vicinity of the elongated hole so as to restrict a movement of the upper rail in an upper direction.

2. The seat slide apparatus for the vehicle according to claim 1, wherein
the seat frame includes an upper belt anchorage arranged at an upper-rear portion thereof so as to support an upper end of a seat belt, and a lower belt anchorage arranged at a lower-rear portion of the seat frame so as to support a lower end of the seat belt, and wherein
the load receiving member is fixed to the upper wall portion of the upper rail so as to be positioned at a position immediately below the lower belt anchorage.

3. The seat slide apparatus for the vehicle according to claim 1, wherein
the load receiving member is inserted through a first hole and a second hole, formed at the upper wall portion of the upper rail and the lower portion of the seat frame, respectively, so as to open therethrough, and wherein
the load receiving member includes a flange portion at an upper end thereof, the flange portion contacting the lower portion of the seat frame in the vicinity of the second hole, provided at the lower portion of the seat frame, so as to restrict the movement of the upper rail in the upper direction.

4. The seat slide apparatus for the vehicle according to claim 2, wherein
the load receiving member is inserted through a first hole and a second hole, formed at the upper wall portion of the upper rail and the lower portion of the seat frame, respectively, so as to open therethrough, and wherein
the load receiving member includes a flange portion at an upper end thereof, the flange portion contacting the lower portion of the seat frame in the vicinity of the second hole, provided at the lower portion of the seat frame, so as to restrict the movement of the upper rail in the upper direction.

5. The seat slide apparatus for the vehicle according to claim 1, wherein
the load receiving member is inserted through a hole, formed at the upper wall portion of the upper rail so as to open therethrough, and wherein
the load receiving member includes a flange portion at an upper end thereof, the flange portion contacting the lower portion of the seat frame in the vicinity of the hole so as to restrict the movement of the upper rail in the upper direction.

6. The seat slide apparatus for the vehicle according to claim 2, wherein
the load receiving member is inserted through a hole, formed at the upper wall portion of the upper rail so as to open therethrough, and wherein
the load receiving member includes a flange portion at an upper end thereof, the flange portion contacting the lower portion of the seat frame in the vicinity of the hole so as to restrict the movement of the upper rail in the upper direction.

7. The seat slide apparatus for the vehicle according to claim 1, wherein
the load receiving member integrally or separately includes a stepped portion contacting an upper surface of the lower rail in the vicinity of the elongated hole when a compression load is applied to the lower portion of the seat frame in a lower direction.

8. The seat slide apparatus for the vehicle according to claim 2, wherein
the load receiving member integrally or separately includes a stepped portion contacting an upper surface of the lower rail in the vicinity of the elongated hole when a compression load is applied to the lower portion of the seat frame in a lower direction.

9. The seat slide apparatus for the vehicle according to claim 3, wherein
the load receiving member integrally or separately includes a stepped portion contacting an upper surface of the lower rail in the vicinity of the elongated hole when a compression load is applied to the lower portion of the seat frame in a lower direction.

10. The seat slide apparatus for the vehicle according to claim 5, wherein
the load receiving member integrally or separately includes a stepped portion contacting an upper surface of the lower rail in the vicinity of the elongated hole when a compression load is applied to the lower portion of the seat frame in a lower direction.

11. The seat slide apparatus for the vehicle according to claim 1, wherein
the lower rail includes an attachment bracket portion adapted to be fixed to the vehicle floor at a lower surface of the bottom wall portion of the lower rail, and wherein
the elongated hole includes a first elongated hole and a second elongated hole formed at the bottom wall portion of the lower rail and the attachment bracket portion, respectively, so as to open therethrough.

12. The seat slide apparatus for the vehicle according to claim 2, wherein
the lower rail includes an attachment bracket portion adapted to be fixed to the vehicle floor at a lower surface of the bottom wall portion of the lower rail, and wherein
the elongated hole includes a first elongated hole and a second elongated hole formed at the bottom wall portion of the lower rail and the attachment bracket portion, respectively, so as to open therethrough.

13. The seat slide apparatus for the vehicle according to claim 3, wherein
the lower rail includes an attachment bracket portion adapted to be fixed to the vehicle floor at a lower surface of the bottom wall portion of the lower rail, and wherein
the elongated hole includes a first elongated hole and a second elongated hole formed at the bottom wall portion of the lower rail and the attachment bracket portion, respectively, so as to open therethrough.

14. The seat slide apparatus for the vehicle according to claim 5, wherein
the lower rail includes an attachment bracket portion adapted to be fixed to the vehicle floor at a lower surface of the bottom wall portion of the lower rail, and wherein
the elongated hole includes a first elongated hole and a second elongated hole formed at the bottom wall portion of the lower rail and the attachment bracket portion, respectively, so as to open therethrough.

15. The seat slide apparatus for the vehicle according to claim 7, wherein
the lower rail includes an attachment bracket portion adapted to be fixed to the vehicle floor at a lower surface of the bottom wall portion of the lower rail, and wherein
the elongated hole includes a first elongated hole and a second elongated hole formed at the bottom wall portion of the lower rail and the attachment bracket portion, respectively, so as to open therethrough.

16. The seat slide apparatus for the vehicle according to claim 1, wherein
the lower rail is adapted to be fixed to the vehicle floor so that the longitudinal direction thereof corresponds to a front-rear direction of the vehicle.

17. The seat slide apparatus for the vehicle according to claim 2, wherein
the lower rail is adapted to be fixed to the vehicle floor so that the longitudinal direction thereof corresponds to a front-rear direction of the vehicle.

18. The seat slide apparatus for the vehicle according to claim 1 further includes:
a front-rear slide mechanism including a front-rear lower rail adapted to be fixed to the vehicle floor so as to extend in a front-rear direction of the vehicle, and a front-rear upper rail assembled to the front-rear lower rail so as to be relatively movable in the front-rear direction of the vehicle, wherein
the lower rail is fixed to the front-rear upper rail so that the longitudinal direction thereof corresponds to a width direction of the vehicle.

19. The seat slide apparatus for the vehicle according to claim 2 further includes:
a front-rear slide mechanism including a front-rear lower rail adapted to be fixed to the vehicle floor so as to extend in a front-rear direction of the vehicle, and a front-rear upper rail assembled to the front-rear lower rail so as to be relatively movable in the front-rear direction of the vehicle, wherein
the lower rail is fixed to the front-rear upper rail so that the longitudinal direction thereof corresponds to a width direction of the vehicle.

* * * * *